United States Patent

[11] 3,571,877

| [72] | Inventor | Ronald D. Zerkle |
| | | Cincinnati, Ohio |
| [21] | Appl. No. | 718,772 |
| [22] | Filed | Apr. 4, 1968 |
| [45] | Patented | Mar. 23, 1971 |
| [73] | Assignee | Neal P. Jeffries, Cincinnati, Ohio, fractional part interest. |

[54] COOLING SYSTEM FOR CUTTING TOOL AND THE LIKE
8 Claims, 10 Drawing Figs.

| [52] | U.S. Cl. | 29/106 |
| [51] | Int. Cl. | B26d 1/00 |
| [50] | Field of Search | 29/106 |

[56] References Cited
UNITED STATES PATENTS

| 2,641,047 | 6/1953 | Jackman | 29/106X |
| 3,077,802 | 2/1963 | Philip | 29/106X |

FOREIGN PATENTS

| 767,202 | 1/1957 | Great Britain | 29/106 |
| 505,234 | 5/1920 | France | 29/106 |
| 1,173,190 | 10/1958 | France | 29/106 |
| 436,715 | 11/1926 | Germany | 29/106 |
| 883,547 | 7/1953 | Germany | 29/106 |
| 428,554 | 12/1947 | Italy | 29/106 |

Primary Examiner—Harrison L. Hinson
Attorney—Wood, Herron & Evans

ABSTRACT: A cutting tool cooling system including a cutting tool having an external cutting edge and an internal cavity with a heat receiving surface in heat exchange and fluid sealed relationship to the cutting edge, and a coolant in the cavity vaporizable at the cavity heat receiving surface for extracting heat therefrom and thereby cooling the tool cutting edge.

PATENTED MAR 23 1971

INVENTOR
Ronald D. Zerkle
BY
Wood, Herron and Evans
ATTORNEYS

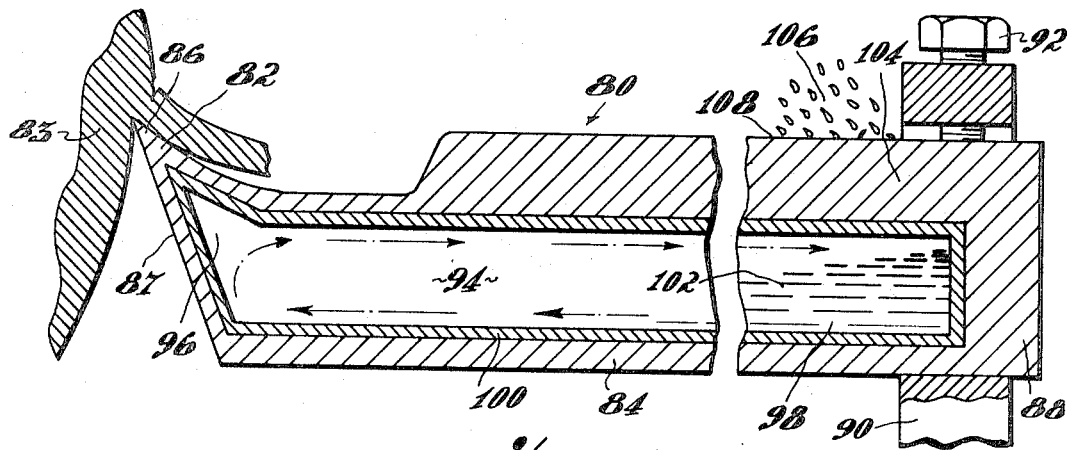
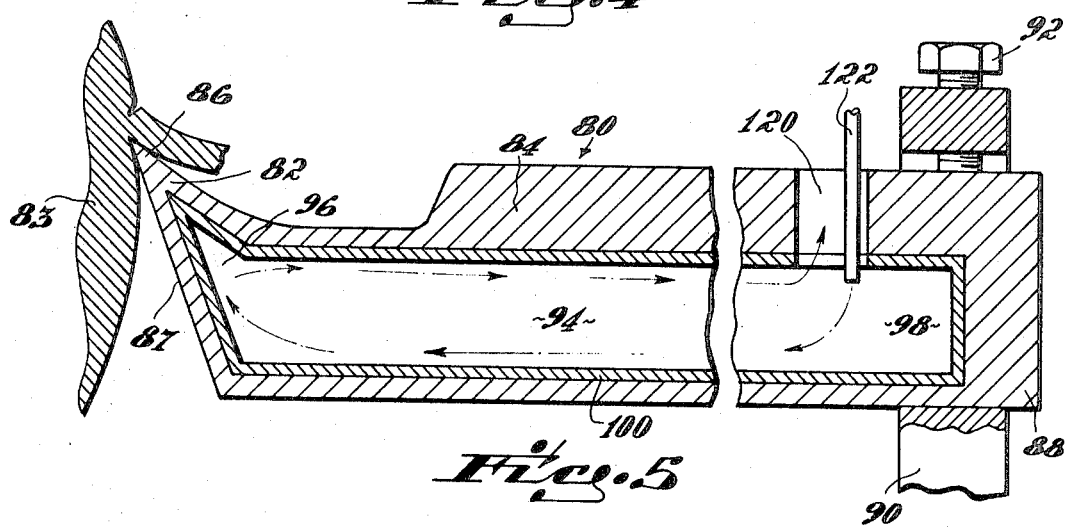
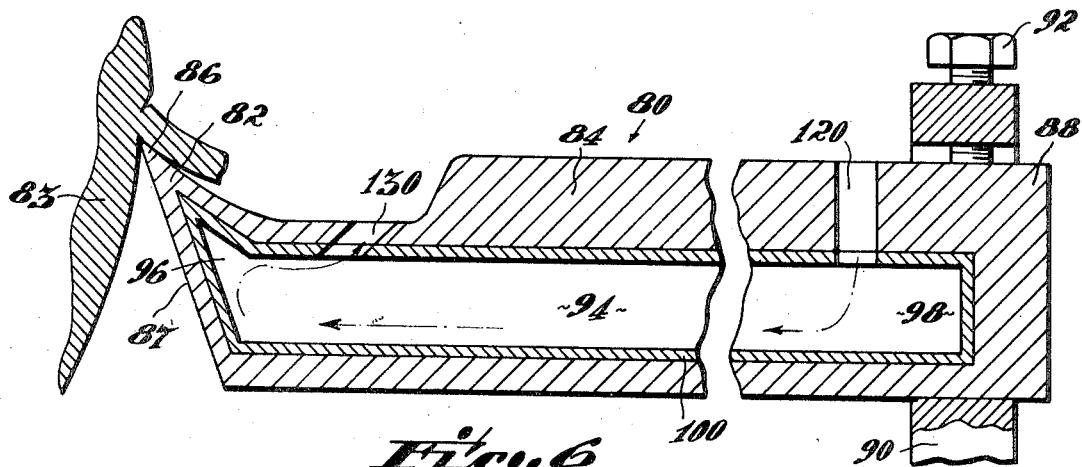

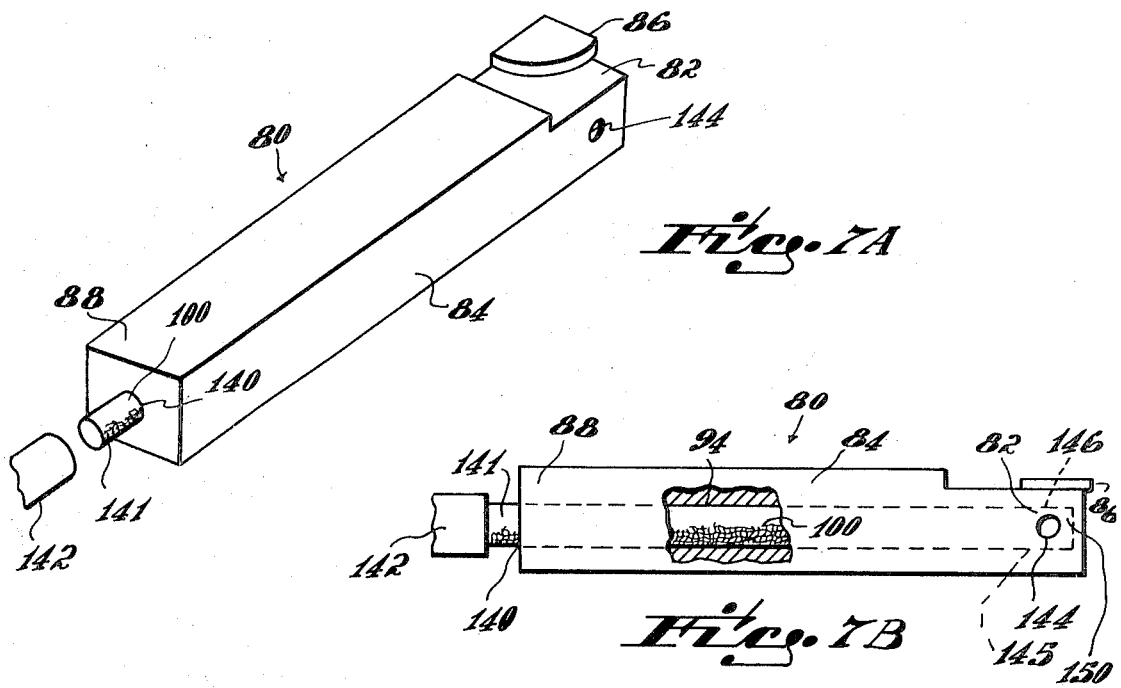
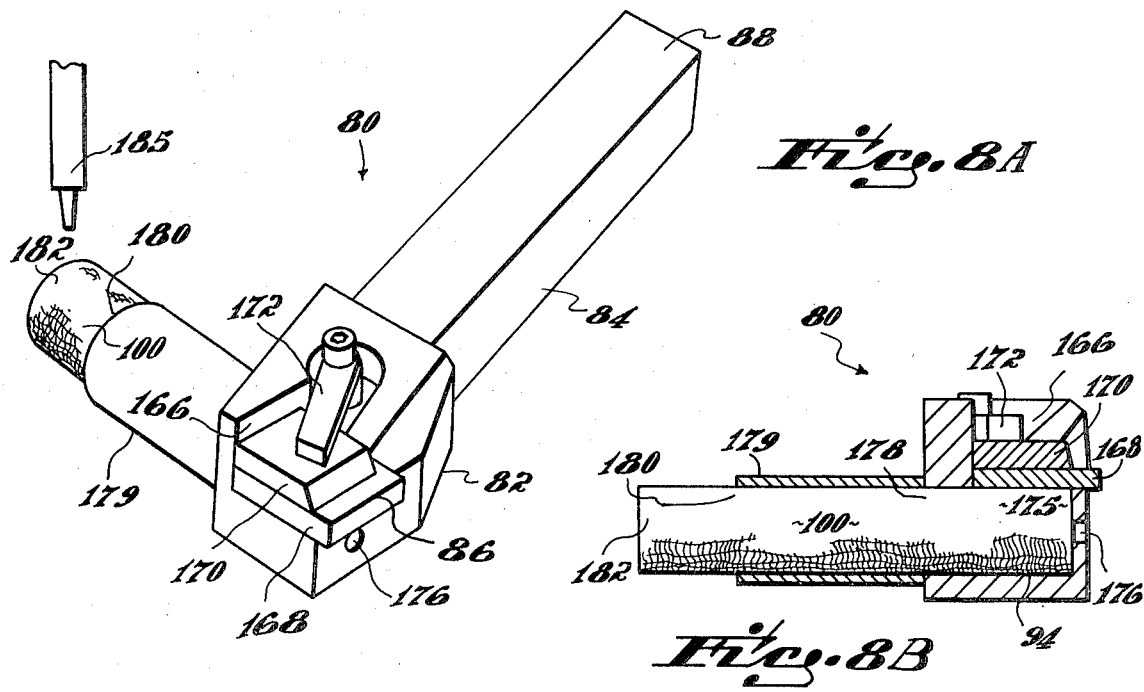

COOLING SYSTEM FOR CUTTING TOOL AND THE LIKE

This invention relates to machine tools and more particularly to machine tool cooling systems.

In a typical machining operation, wherein it is desired to remove material from a workpiece such as a length of bar stock to alter its shape, finish, and/or dimensions, the workpiece is mounted in a machine for motion relative to a cutting tool. The relative motion between the workpiece and the cutting tool is effective to abrade, chip, shave, or otherwise cause removal of stock from the workpiece. Such relative cutting motion may be produced by movement of the workpiece relative to a substantially stationary cutting tool. Illustrative of such cutting motion is that which occurs in a turning lathe wherein the workpiece is mounted between centers for rotation about its axis in cutting relationship to a tool whose cutting edge contacts the workpiece periphery. Alternatively, the relative cutting motion may be established by movement of the tool relative to a substantially stationarily held workpiece, such as occurs in a drilling machine wherein a drill bit rotatable about its axis is urged into the workpiece to affect relative cutting motion.

Regardless of the manner in which the relative cutting motion is produced, that is, by movement of the tool or workpiece or both, the cutting process generates substantial heat. This heat is generated as a consequence of two factors, namely, rubbing motion or friction between the workpiece and the tool which occurs at the interface of the workpiece and the tool cutting edge, and deformation of the material constituting the surface layer of the workpiece which occurs as chips are formed. The amount of heat generated increases with increases in workpiece hardness, tool cutting edge dullness, cutting edge and workpiece relative velocity, and depth of cut. If the heat generated at the tool-workpiece interface is not removed, the temperature of the tool, particularly the cutting edge, increases to a high value. As those skilled in the machine tool field will appreciate, high tool edge temperatures are undesirable for a number of reasons. Principal among these is that high temperatures increase tool wear. In fact, the amount of tool wear increases disproportionately fast with increasing tool edge temperature. For example, according to one source, in the machining of certain materials tool wear varies directly with the temperature to the twentieth power. This implies that a tool operating at 1500° F. wears nine times faster than a tool operating at 1300° F. under the same conditions. One of the most important consequences of increased tool wear is that it shortens tool life, and hence increases tool cost and machine downtime.

Unduly high tool edge temperatures, in addition to increasing tool wear, also thermally damage the workpiece, reducing its strength and deleteriously affecting its surface finish and appearance.

In the past, it has been proposed to reduce the temperature of the tool cutting edge by copiously applying liquid coolants to the external surface of the tool and workpiece. Typically, this has been accomplished by directing a stream of liquid coolant, using a nozzle or the like, toward the tool-workpiece interface. Theoretically, heat generated by the cutting process at the tool-workpiece interface is conducted to the liquid, which liquid is then transported away from the interface to effect a transfer of heat from the cutting edge and thereby reduce the cutting edge temperature.

As those skilled in the art are aware, cooling of machine tool cutting edges by the external application of liquid coolant has not been entirely satisfactory for a number of reasons. Principal among these is that external liquid cooling, at best, produces a low heat transfer coefficient, approximately 10-–1000 B.t.u./hour/square foot/degree F. This seriously limits the amount of heat that can be removed at a given stock removal rate for a given combination of tool and workpiece, and hence the maximum attainable temperature reduction at the tool cutting edge. Additionally, external liquid cooling is not very effective above temperatures of approximately 800° F., and at temperatures of 1400° F. and above is so ineffective that it is generally not used. A number of factors contribute to the ineffectiveness of liquid cooling, particularly at high temperatures. One such factor is the formation of chips, which block the flow of liquid coolant to the workpiece-cutting edge interface.

In addition to the general inability of external liquid cooling to materially reduce the temperature of the cutting edge, particularly at high cutting edge temperatures, external liquid cooling is undesirable for a further reason, namely, it produces contamination of the workpiece and environment. External liquid cooling has also been known to prevent oxidation of the chip, causing the chip to weld to the tool. This condition increases tool wear. It also increases the required cutting forces by the amount necessary to shear the weldments and thereby permit further chip formation. Finally, external liquid cooling subjects the tool to excessively large cyclic variations in temperature as the tool undergoes cycles wherein it sequentially engages the workpiece to make a cutting pass therein and disengages the workpiece to enable tool repositioning for the successive cutting pass. The tool temperature rises during the cutting pass phase of the cycle when substantial heat is generated, whereafter it falls during the tool repositioning phase when no heat is generated, all during which time the tool may be continuously and uniformly subjected to a stream of coolant. These cyclic temperature variations cause the tool to be subjected to shock which in certain instances, such as when carbide tools are used, causes the tool to crack.

Certain disadvantages of the foregoing external liquid cooling proposal have been obviated in the past by a second approach to the tool cooling problem. In this approach, coolant in the form of vapor is introduced under pressure of approximately 80—90 p.s.i. into a bore formed in the cutting tool. The vapor coolant is then forced from the bore through orifices located behind the cutting edge which connect the bore with the atmosphere. Expansion of the vapor as it is released at the orifices absorbs heat from the tool. This vapor coolant approach, because the vapor is much colder than the temperature of most liquid coolants, achieves higher rates of heat removal than frequently encountered with liquid cooling techniques. However, it has not removed all the disadvantages of liquid cooling. For example, contamination of the environment is still a problem by reason of the escape of the vapor coolant to the atmosphere. Additionally, complex apparatus in the form of evaporators, pressure regulators, control valves and the like is required to provide the pressurized vapor necessary for this technique.

It has been an objective of this invention to provide a system for cooling cutting tools which is more effective than any heretofore known, particularly at high tool temperatures, and yet does not have the many disadvantages accompanying prior art cooling techniques. This objective has been accomplished in accordance with certain principles of this invention by utilizing a fundamentally different approach to the design of a machine tool cooling system which represents a marked departure, both conceptually and in effectiveness, from the various cooling schemes heretofore proposed. Specifically, the foregoing objective has been accomplished by providing a unique, internal two-phase tool cooling system which includes a cutting tool with an internal cavity having a heat receiving surface in coolant sealed and heat exchange relationship to the tool cutting edge, and coolant handling means for supplying vaporizable coolant to, and removing vaporized coolant from, the internal heat receiving surface of the cavity. With the above two-phase tool cooling system having the tool construction and coolant means indicated, heat is very efficiently transferred from the cutting edge by the coolant vaporization at the internal heat receiving surface and the subsequent removal of the vaporized coolant to a remote point, to produce reduction in tool edge temperature far greater than available with prior art proposals.

In one form of this invention, the internal cavity is sealed and preferably provided with capillary means, and the vaporizable coolant is liquid. The capillary means function to efficiently transport liquid to the heat receiving surface from a heat transmitting surface of the cavity remote from the cutting edge. In accordance with this embodiment vaporizable liquid is transported to the heat receiving surface proximate the cutting edge by the capillary means where it is vaporized, extracting heat from the tool and thereby cooling the cutting edge. The vaporized liquid is then caused to move, by reason of a pressure differential in the cavity, to the heat transmitting surface at the end of the cavity remote from the cutting edge where it condenses. The net result of this process of liquid transport and subsequent vaporization adjacent the cutting edge at the heat receiving surface, followed by condensation of the vapor remotely at the heat transmitting surface, is the production of a very efficient, internal two-phase cooling method for reducing the temperature of a cutting tool.

In accordance with another embodiment of this invention the internal cavity of the cutting tool is provided with at least one opening for both supplying liquid to the cavity and exhausting vapor therefrom. Preferably, in accordance with this embodiment, the cavity is provided with two passages. One passage admits vaporizable liquid for subsequent vaporization at the internal heat receiving surface, while the other exhausts vaporized liquid to the atmosphere, thereby enhancing the transfer of heat from the cutting edge.

One of the principal advantages of this invention wherein internal two-phase cooling is utilized to cool the tool cutting edge is that heat transfer coefficients of 1000—20,000 B.t.u./hour/square foot/degree F. are possible. This is in contrast, for example, to coefficients of from 10—1000 B.t.u./hour/square foot/degree F. attainable with presently proposed external fluid cooling techniques. Such heat transfer coefficients as are attainable with the cooling system of this invention result in substantial reductions in tool edge temperature. For example, it has been found that at temperatures of 800° F. a temperature drop of 400° F. is attainable in contrast to a temperature drop of 200° F. attainable with conventional liquid cooling techniques. Since tool life increases markedly with decreased tool operating temperature, a drop of 400° F., while only representing a drop of twice that attainable with conventional techniques, provides an increase in tool life many times that obtainable using conventional liquid cooling systems.

A further advantage of applicant's invention attributable to the internal cooling aspect thereof is that contamination of the workpiece by the coolant does not occur, nor does prevention of chip oxidation and subsequent chip weldment to the tool present a problem. A further and equally important advantage of this invention is that conventional machine tools may be relatively easily structurally modified to operate in accordance with the principles of this invention. This eliminates the need for costly tool changeovers. Additionally, very small quantities of coolant are required, and costly and complex coolant pumping apparatus is unnecessary. Also, a common coolant can be used for cutting different materials, eliminating the need for stocking a variety of different coolants. Finally, it enables tool cooling to be used in high temperature cutting operations, for example, above 1400° F., where heretofore the available tool cooling was so ineffective that cooling was not ordinarily used.

Other objectives and advantages of this invention will become more readily apparent from a detailed description of this invention given in conjunction with the description of the drawings in which.

FIGS. 4, 5, 6, 7A, 7B, 8A, and 8B are views of additional embodiments of the machine tool cooling system of this invention.

Figure 1:
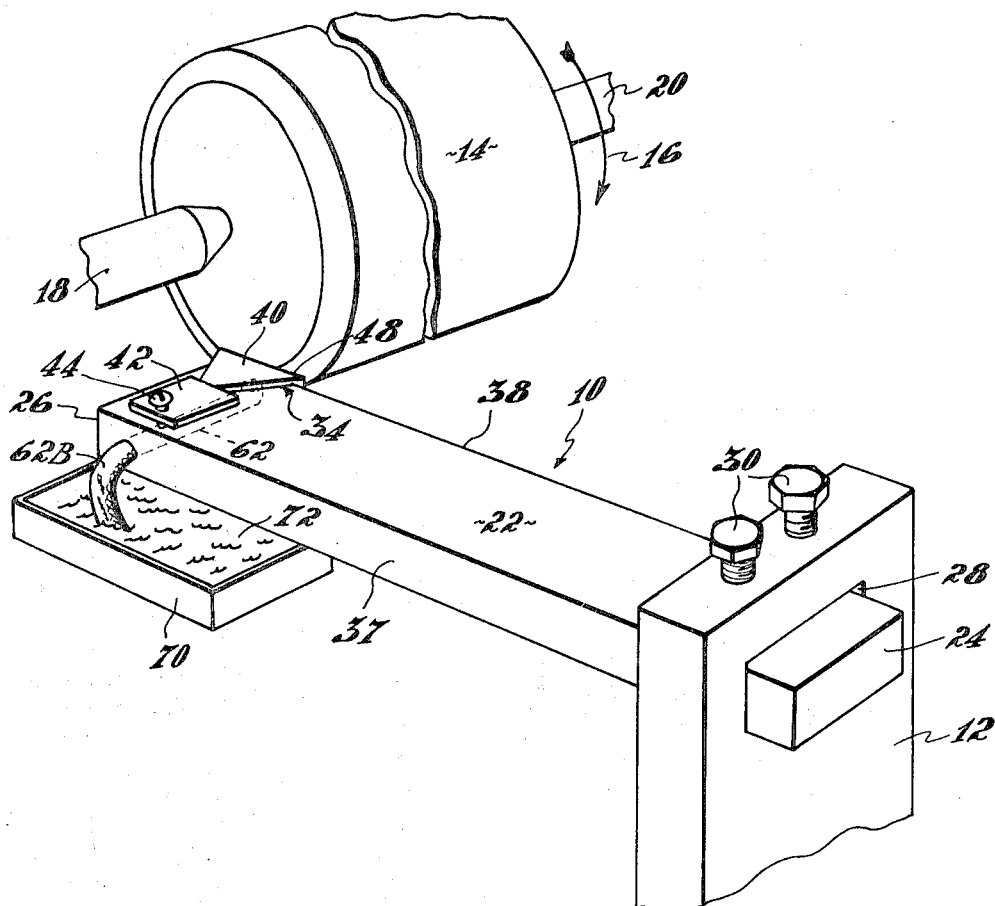
FIG. 1 is a perspective view of a preferred embodiment of a cutting tool utilizing certain of the machine tool cooling principles of this invention.
Figure 2:
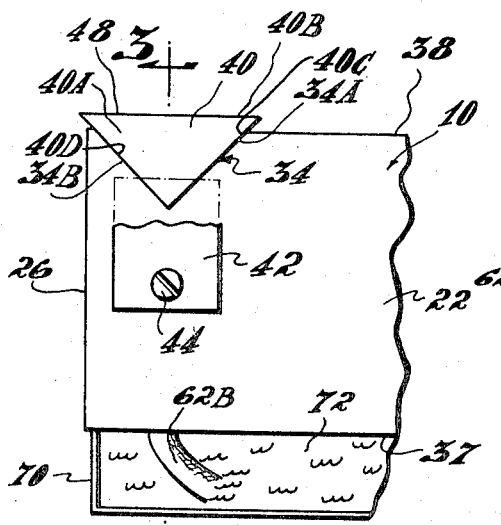
FIG. 2 is a plan view of a portion of the cutting tool depicted in FIG. 1.
Figure 3:
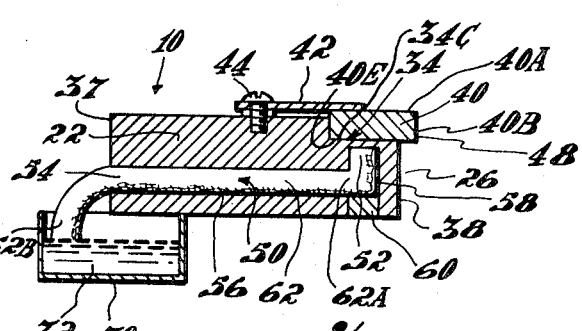
FIG. 3 is a cross-sectional view taken along line 3-3 of FIG. 2.

Referring to FIGS. 1—3, internal two-phase cooling of a cutting tool is depicted in conjunction with an application in which the invention finds particular, though not exclusive utility. Specifically, it is depicted in conjunction with its use to cool a lathe turning tool. Referring to FIGS. 1-3, a lathe turning tool 10 held by a tool post 12 is shown in operative cutting relationship to a workpiece 14 mounted between centers 18 and 20 for movement in the direction of arrow 16. The cutting tool 10, considered in more detail, includes a shank or body 22 of generally rectangular cross section having an inner end 24 and an outer end 26. The inner end 24 slideably interfits in an opening 28 formed in the tool post 12 and having a cross section configured similarly, but slightly larger than that of the cutting tool shank end. The cutting tool 10, by reason of the sliding fit between its inner end 24 and the opening 28 in which it is positioned, is adapted to be secured at selectively variable positions along its longitudinal axis. To facilitate such securing, a screw 30 threadable in the upper end of the tool post 12 is provided. The screw 30 when threaded down into the tool post, locks the cutting tool in the axial position to which it has been inserted in the opening 28.

The outer end 26 of the cutting tool 10 is provided with a triangular recess 34 defined by vertical sides 34A and 34B and bottom 34C of shank end 26. A carbide insert 40 having a generally triangular cross section of substantially the same configuration as the recess 34 is also provided. The insert 40 has a cutting edge 48 defined by the intersection of a top surface 40A and a side surface 40B. The insert 40 is adapted to be operatively positioned in the recess 34 and clamped therein by a holddown clamp 42. Clamp 42 has a lip which engages a portion of the upper surface 40A of the carbide insert 40 for securely locking the insert in the recess 34 when a screw 44 passing through a suitable aperture in the clamp and threadably engageable with the end segment 26 is tightened. When the insert is operatively positioned in the recess 34, vertical insert side surfaces 40C and 40D intimately contact recess sides 34A and 34B, respectively, and the recess bottom 34C intimately contacts the insert bottom 40E. Additionally, cutting edge 48 extends beyond the side 38 of the shank end 26.

The novel cutting tool 10 of this invention depicted in FIGS. 1—3 further includes an internal cavity or chamber 50. The cavity 50 includes a first, inner, or heat receiving surface region generally indicated by the reference numeral 52 which is in heat exchange relationship with the cutting edge 48 of the carbide insert 40, by reason of the intimate physical contact between the carbide insert and recess bottoms 40E and 34C, respectively. The heat receiving surface region 52 is also in fluid sealed relationship to the cutting edge 48 of the tool 10 by reason of the insert and tool material separating the cutting edge and heat receiving surface. The cavity 50 further includes a second, outer, or heat transmitting surface region 54 located more remote from the cutting edge 48 than the heat receiving surface region 52. In practice the cavity 50 may be formed by drilling blind horizontal hole 56 from the vertical tool side 37 through the outer shank end 26 toward the opposite vertical tool side 38, in which case the heat transmitting surface 54 of the cavity 50 is opening in the shank end side 37 formed by the hole 56. Cooperating with the horizontal hole 56 is a vertical blind hole 58 which intersects and thereby communicates with the hole 56. A plug 60 inserted in the lower portion of the hole 58 seals the lower end of the vertical hole. The hole 58 may be blind as shown in FIG. 3, terminating slightly below the interface of the recess and cavity bottoms 34C and 40E, respectively. Alternatively, the hole 58 may be a through hole communicating cavity 50 with the insert bottom 40E. In this case, the portion of the insert bottom 40E overlying the hole 58 combines with the surface of the cavity 50 adjacent the overlying insert bottom surface to form the heat receiving surface 52. While the through hole embodiment enhances heat exchange between the cutting edge 48 and the heat receiving surface 52, structural rigidity and strength of the tool 10 may be slightly reduced.

Preferably positioned in the cavity 50 is a capillary means 62 which extends the entire length of the cavity 50, having its inner end 62A in contact with the heat receiving surface 52 adjacent the bottom surface 40E of the carbide insert 40 and its outer end 62B projecting from the cavity 50 in the vicinity of the heat transmitting cavity surface region 54. The capillary means 62 preferably is fabricated of 120 mesh stainless steel Dutch twill material configured in the form of a tube.

Associated with the cutting tool 10 is a fluid means 70 for supplying fluid to the projecting end 62B of the capillary mesh 62. The fluid means 70 is preferably in the form of a reservoir or trough secured to the outer end 26 of the tool shank 22. The trough 70 is provided with a suitable supply of the fluid 72. The fluid 72 preferably is water provided with a suitable rust preventative. The level of the water 72 is maintained by suitable means, such as a dropper (not shown), above the extremity of the capillary means end 62B.

In operation, liquid water 72 in the trough 70 is fed or pumped by capillary action afforded by the mesh 62 from the trough along the horizontal and vertical holes 56 and 58 to the heat receiving surface region 52 of the cavity 50. Due to the relative motion at the interface of the cutting edge 48 of the carbide insert 40 and the workpiece 14, cutting edge 48 as well as contiguous and proximately located portions of the insert 40 and the outer shank end 26, are heated to a level above the vaporization point of the water, causing vaporization of the water pumped to the heat receiving surface region 52. The vaporized water produced at the heat receiving surface region 52, due to a pressure differential in the cavity 50, flows in the internal cavity 50 toward the heat transmitting surface region 54 where it escapes to the atmosphere.

Continued supply of vaporizable liquid, such as water, from the trough 70 to the heat receiving surface region 52 of the cavity 50 by the capillary means 62, coupled with continued vaporization of the supplied water at the heat receiving surface region, followed by exhaust to the atmosphere of the vaporized water via the outer end of the horizontal hole 56 located proximate the heat transmitting surface region 54, provides continued and highly efficient cooling of the cutting edge 48 of the carbide insert 40. The efficiency of the cooling process is attributable to the extremely high heat transfer coefficients afforded by the vaporization of the liquid occurring at the heat receiving surface region 52 of the cavity 50. In practice heat transfer coefficients of 1000—5000 B.t.u./hour/square foot/degree F. are possible with the tool cooling apparatus of this invention. This heat transfer coefficient is in contrast, for example, to rates of 10—1000 B.t.u./hour/square foot/degree F. achievable with conventional liquid cooling techniques.

As those skilled in the art will appreciate, numerous modifications in the preferred embodiment depicted in FIGS. 1—3 may be provided without departing from the spirit and scope of this invention. For example, while the preferred embodiment has been provided with capillary means 62 to supply vaporizable fluid to the inner surface region 52 of the cavity 50 such capillary means are only preferred, and may be omitted if desired. If the capillary means 62 are omitted, the vaporizable fluid may be supplied to the inner surface region 52 of the cavity 50 by gravity feed or fluid pressure means. Where capillary means are utilized the capillary means may take many forms. For example, the capillary means 62, while disclosed as being 120 mesh stainless steel Dutch twill and having a tubular cross section, may be fabricated of other materials having different cross sections. For example, other porous capillary means, such as woven cloth or fabric wicks, having other mesh sizes may be used. Additionally, the cross section of the capillary means may be V-shaped, oval, flat or the like. If the cross section of the capillary means is V-shaped, the capillary means itself functions as a trough or conduit for supplying vaporizable fluid to the heat receiving surface region 52 of the cavity 50. Capillary material, if used, should be selected to be noncorrosive with respect to the vaporizable fluid 72. Additionally, the capillary means 62 when inserted in the cavity 50 must not have a bulk or volume such that the internal cavity becomes constricted, thereby unnecessarily impeding the escape or exhaust of vaporized fluid to the atmosphere. If the internal cavity 50 becomes unnecessarily constricted by reason of an excess volume of capillary means therein, the escape of vaporized fluid, and hence the heat transfer efficiency of the system, if reduced.

The cavity 50 need not have a circular cross section nor be comprised of intersecting horizontal and vertical bores. The internal cavity 50 may be formed in a variety of configurations and shapes to suit the needs of the user. In designing the shape of the internal cavity 50, to obtain optimum results, the cavity should have a heat receiving surface region 52 which is as large and as close to the cutting edge 48 as possible consistent with obtaining a structure which prevents film boiling of the vaporizable fluid and is sufficiently strong to withstand the stress and forces encountered in the cutting process.

The vaporizable fluid 72 may be comprised of a variety of different materials or combinations thereof. For example, while water has been found to be preferable for cooling tools with cutting edge temperatures as high as 1400° F., other vaporizable fluids may be used. For example, organic liquids such as ethyl and methyl alcohol, and fluorocarbons such as freon are suitable substitutes. If desired, the vaporizable fluid may be refrigerated to enhance the heat transfer process. In the selection of the vaporizable fluid it is only necessary that the fluid be vaporizable at the temperature to which the heat receiving surface region 52 becomes elevated by reason of the heat generated by the cutting process and conducted to the heat receiving surface. Preferably, however, the vaporizable fluid should have a high latent heat of evaporation, and a high surface tension.

Another embodiment of the tool cooling system of this invention is depicted in FIG. 4. Referring to FIG. 4, a lathe cutting tool 80 is shown in longitudinal cross section. The tool 80 includes a shank 84 having an outer end 82 provided with a cutting edge 86 in cutting relationship to a moving workpiece 83, and an inner end 88 secured to a tool post 90 by means of cooperating screw 92. The tool 80 is provided with an internal cavity 94 having a first or heat receiving surface region 96 in heat exchange and fluid sealed relationship to the cutting edge 86, and a second or heat transmitting surface region 98 spaced more remote from the cutting edge 86 than the surface region 96. The cavity 94 is shown schematically and may be formed by a variety of machining processes well known by those skilled in the art and therefore not discussed in detail herein. Preferably, the heat receiving surface 96 is spaced as close to the outer surface region 87 proximate the cutting edge 86 as possible consistent with tool strength and ability to withstand forces present in the cutting process.

A suitable capillary means 100, such as a mesh material, lines the internal surface of the cavity 94, being in intimate contact with the surfaces 96 and 98. The mesh material 100 functions to supply a vaporizable fluid 102 to the heat receiving surface 96 from a pool formed in the vicinity of the heat transmitting surface 98.

In operation, the heat generated at the outer end of the cutting tool 80 by the cutting process, particularly at the cutting edge 86, is conducted through the cutting tool outer end 82 to the heat receiving surface 96 of the cavity 94. At the heat receiving surface 96, the vaporizable fluid supplied by the mesh 100 from the pool 102 at the heat transmitting surface 98 is vaporized, extracting heat from the outer end 82 of the tool 80. The vaporized fluid is then transported, by reason of a pressure differential in the cavity 94 to the opposite end of the cavity where it condenses on the heat transmitting surface 98 which is maintained at a temperature below the condensation point of the fluid by a coolant spray 106, such as a pressurized air stream, directed onto the tool exterior 108. Heat transmitted to the heat transmitting surface 98 by reason of the vapor condensation is then conducted through the adjacent tool wall 104 where it is removed by the coolant spray 106 applied to the exterior surface 108 of the inner end 84 of tool 80.

The vaporizable fluid, following condensation at the heat transmitting surface 98, enters the pool 102 wherein it is subsequently transported by capillary action of the mesh 100 back to the heat receiving surface 96 of the cavity 94 whereupon the cycle of vaporization, vapor transport, condensation, and vaporizable fluid transport is repeated, providing a continuous transfer of heat at high efficiency from the tool cutting edge 86 to the coolant 106. The transfer of heat from the tool cutting edge 86 may be enhanced by using, as the vaporizable fluid, liquid metals such as liquid sodium, liquid lithium, or other suitable liquid metals having high specific heats.

FIGS. 5, 6, 7A and 7B, and 8A and 8B depict four further embodiments of this invention. In FIGS. 5, 6, 7A and 7B, and 8A and 8B reference numerals identical to those appearing in FIG. 4 are utilized to indicate structural elements in these FIGS. which find substantially identical counterparts in FIG. 4. The modifications of the tool of FIG. 4, which are depicted in FIGS. 5, 6, 7A and 7B, and 8A and 8B provide two-phase internal cooling systems which may be classified as "open systems" in contrast to the closed two-phase internal cooling system of FIG. 4. Specifically, in FIG. 5 a passage 120 communicating at one end with the surface 108 of the inner tool end 88 and at the other end with the heat transmitting surface region 98 of the cavity 94 is provided. The passage 120 permits vaporizable fluid which has been vaporized at the heat receiving surface 96 to exhaust to the atmosphere, as well as permits insertion of conduit 122 for supplying vaporizable fluid from a source (not shown) to the interior of the cavity 94 for subsequent vaporization at the heat receiving surface 96.

The structure of FIG. 6 includes, in addition to the passage 120, a second passage 130. The passage 130 at its lower end communicated with the cavity 94 at a point proximate the heat receiving surface 96 and at its other end with the atmosphere. To prevent constriction of the vapor outlet passage 130 by accumulated chips, a suitable vapor chip shield (not shown) can be provided. Alternatively, the passage 130 may be located in the vertical sidewall of the cavity. In the embodiment of FIG. 6 vaporizable fluid is admitted to the cavity 94 through the passage 120, and provides a supply of vaporizable fluid to the heat receiving surface 96. Vaporized fluid generated at the heat receiving surface 96 exhausts through the passage 130 to the atmosphere. By exhausting the vaporized fluid at a point adjacent the heat receiving surface 96, preheating of the vaporizable fluid as it moves toward the heat receiving surface 96 from the inlet passage 120 is reduced to a minimum.

In the embodiment of FIGS. 7A and 7B the cavity 94 of the tool 80 is provided with an opening 140 in the end 88 which communicates, via a tube 141 connected to and extending therefrom, with a fluid supply hose 142. Also included is an opening 144 communicating at one end with the cavity 94 adjacent the outer shank end 82, and communicating at the other end with the atmosphere. The passage 144 intersects the interior of the cavity 94 at a point approximately midway between the bottom cavity surface 145 and the top cavity surface 146.

In operation, fluid is admitted into the cavity 94 by the hose 142 and tube 141 where it is pressure fed to the capillary means 100 and thence to the heat receiving surface 150 of the cavity by the capillary means 100. At the heat receiving surface 150, the vaporizable fluid is vaporized by the heat transported thereto from the cutting edge 86, lowering the cutting edge temperature. The vaporized fluid then exhausts to the atmosphere via the passage 144.

The passage 144, in addition to serving as an exhaust for the vaporized fluid, also acts as an overflow for unvaporized fluid fed to the cavity 94 by the hose 142. In practice, fluid flow from the hose 142 is regulated to rate where there is a very slight trickle of unvaporized fluid from the passage 144. The presence of such a trickle provides an indication that a sufficient and proper supply of vaporizable fluid is being fed to the capillary means 100 for subsequent transport to the heat receiving surface 150.

The embodiment of FIGS. 8A and 8B includes a cutting tool 80 having an inner end 88 securable to a tool post (not shown), and an outer end 82 provided with a recess 166 in an upper corner thereof functioning in a manner similar to recess 34 of FIGS. 1—3. Positioned in the recess 166 is a carbide insert 168 having a cutting edge 86 which serves a function similar to that of the carbide insert 40 of FIGS. 1—3. Positioned above the carbide insert 168 is a chip breaker 170. Both the chip breaker 170 and the carbide insert 168 are stationarily secured in the recess 166 by a suitable clamp 172.

The outer end 82 of the tool 80 is provided with an internal cavity 94 having a heat receiving surface 175 comprising the bottom surface of the carbide insert 168, and a heat transmitting surface including an opening 176 connecting the cavity 94 and atmosphere. The opening 176 is positioned approximately midway between the bottom and top of the cavity 94. The cavity 94 is provided with an opening 178 connecting the cavity and one end of a tube 179 secured to the tool end 82. The other end 180 of the tube 179 is open to the atmosphere. Inserted in the tube 179 and the cavity 94 is a tubular capillary means 100 which extends between the heat receiving surface 175 at one end of the cavity and a point beyond the opening 180 of the tube 179.

In operation, vaporizable fluid is gravity fed to the capillary means 100 from a dropper 185 positioned above the projecting capillary means end 182. The gravity fed fluid is thereafter transported by the capillary means 100 to the heat receiving surface 175 of the cavity 94. At the heat receiving surface 175, the vaporizable fluid is vaporized by the heat transmitted thereto from the cutting edge 86 of the carbide insert 168. The vaporized fluid then exhausts from the cavity 94 to the atmosphere via the passage 176.

The function and operation of the passage 176, in addition to serving as an exhaust for the vaporized fluid, also serves as an overflow for the unvaporized fluid fed to the cavity 94 from the dropper 185 via the capillary means 100. In practice, the rate of emission of fluid from the dropper 185 is regulated to just provide a trickle of vaporizable fluid overflowing through the passage 176. This trickle provides an indication that a sufficient and proper supply of vaporizable fluid is being fed to the heat receiving surface 175 of the cavity 94.

The vaporizable liquid utilized in the embodiments of FIGS. 5, 6, 7A and 7B, and 8A and 8B, like the vaporizable fluid utilized in the embodiments of FIGS. 1—3, preferably is water, although as indicated previously other fluids may be employed. The vaporizable fluid utilized in the embodiment of FIG. 4 preferably is a liquid metal, such as liquid sodium, potassium, etc. Water is not preferred due to the high pressures developed when utilized in a closed system of the type depicted in FIG. 4.

The invention has, for the purpose of clarity and illustration, been disclosed with reference to its use in a system for cooling cutting tools of the type used in turning lathes. However, those skilled in the art will readily understand that the invention is susceptible of use for cooling other types of cutting tools. For example, it is contemplated that this invention can be used to cool drill bits, milling cutters, and the like. It also is contemplated that this invention may be used to cool forming tools, such as punches and dies.

I claim:
1. A cutting tool comprising:
   a tool body provided with a cutting edge;
   chamber-defining structure having an internal surface in heat exchange relationship to said tool body adjacent said cutting edge;
   a substantially unpressurized liquid coolant supply connected to said chamber for supplying to said chamber substantially unpressurized liquid coolant vaporizable by heat transmitted from said cutting edge through said body to said internal surface; and
   a capillary active transport means at least partially located within said chamber and having a first section thereof proximate said internal surface and a second section in communication with said unpressurized liquid coolant supplied by said supply, to transport said liquid coolant by capillary action to said internal surface for vaporization thereat by heat transmitted thereto through said body from said cutting edge.

2. The cutting tool of claim 1 wherein said unpressurized liquid coolant supply supplies a coolant liquid including water.

3. An article of manufacture comprising:
a cutting tool having an external cutting edge and an internal chamber with a heat-receiving surface in heat exchange relation to said cutting edge; and
a capillary mesh at least partially located within said chamber and having a first section thereof proximate said heat-receiving surface and a second section remote therefrom, to transport substantially unpressurized liquid coolant by capillary action to said heat-receiving surface for vaporization thereat by heat transmitted thereto from said cutting edge.

4. The cutting tool of claim 1 wherein said body includes a vapor exhaust passage communicating with said chamber and with the atmosphere which exhausts vapor from said chamber produced when said coolant liquid vaporizes at said internal surface.

5. An article of manufacture comprising:
a cutting tool having an external cutting edge and an internal sealable chamber with a heat-receiving surface in heat exchange relation to said cutting edge and a heat-transmitting surface remote from said cutting edge; and
capillary active means located within said chamber and having a first section thereof proximate said heat-receiving surface and a second surface proximate said heat-transmitting surface, said capillary active means being effective to transport liquid coolant by capillary action from said heat-transmitting surface to said heat-receiving surface for vaporization thereat by heat transmitted thereto from said cutting edge, said vaporized coolant thereafter condensing at said heat-transmitting surface.

6. The article of manufacture of claim 5 wherein said capillary active means is mesh and said liquid coolant is a liquid metal.

7. The cutting tool of claim 1 wherein said internal surface is dimensioned to permit vaporization of said liquid coolant at said surface without film boiling.

8. The cutting tool of claim 3 wherein said heat-receiving surface is dimensioned to permit vaporization of said liquid coolant at said surface without film boiling.